United States Patent
Panigrahi et al.

(10) Patent No.: US 11,660,647 B2
(45) Date of Patent: May 30, 2023

(54) SYSTEM AND METHOD FOR CLEANING SURFACES THROUGH DRONES

(71) Applicant: Wipro Limited, Bangalore (IN)

(72) Inventors: Sarthak Panigrahi, Bhubaneswar (IN); Anandaraj Thangappan, Bangalore (IN)

(73) Assignee: Wipro Limited, Bangalore (IN)

(*) Notice: Subject to any disclaimer, the term of this patent is extended or adjusted under 35 U.S.C. 154(b) by 246 days.

(21) Appl. No.: 17/237,396

(22) Filed: Apr. 22, 2021

(65) Prior Publication Data
US 2022/0280987 A1    Sep. 8, 2022

(30) Foreign Application Priority Data

Mar. 2, 2021   (IN) .............................. 202141008719

(51) Int. Cl.
*B08B 13/00*   (2006.01)
*G08G 5/00*    (2006.01)
(Continued)

(52) U.S. Cl.
CPC .............. *B08B 13/00* (2013.01); *B08B 1/001* (2013.01); *B08B 1/008* (2013.01); *B08B 3/02* (2013.01);
(Continued)

(58) Field of Classification Search
CPC ......... B08B 1/001; B08B 1/008; B08B 13/00; B08B 3/02; G05B 13/0265; B64C 39/024;
(Continued)

(56) References Cited

U.S. PATENT DOCUMENTS

| 10,424,231 B2 * | 9/2019 | Salem ...................... G09F 21/12 |
| 2017/0158329 A1 * | 6/2017 | Liu .......................... B08B 3/024 |

(Continued)

FOREIGN PATENT DOCUMENTS

| WO | WO-2020014160 A1 * | 1/2020 | ............... A47L 1/02 |

OTHER PUBLICATIONS

Altshuler, Y. et al., "Swarm Robotics for a Dynamic Cleaning Problem", Jul. 2005, IEEE, pp. 1-8.

*Primary Examiner* — Vivek D Koppikar
*Assistant Examiner* — Andrew James Trettel
(74) *Attorney, Agent, or Firm* — Finnegan, Henderson, Farabow, Garrett & Dunner, LLP

(57) ABSTRACT

This disclosure relates to system and method for cleaning surfaces using drones. The method includes identifying, by a first drone, a cleaning strip in contact with a surface. The cleaning strip connects a second drone and a third drone. The second drone is communicatively coupled with the third drone. The first drone is communicatively coupled with each of the second drone and the third drone. The method further includes releasing a cleaning agent at a preconfigured pressure upon a current target region of the surface near the cleaning strip. The method further includes relocating the cleaning strip upon the current target region. The method further includes performing a set of oscillations through the cleaning strip across the current target region. Each of the set of oscillations includes coordinating a displacement of the cleaning strip by a predefined distance, alternating towards each of ends of the cleaning strip.

16 Claims, 7 Drawing Sheets

(51) Int. Cl.
*G05B 13/02* (2006.01)
*B64C 39/02* (2023.01)
*B64D 1/18* (2006.01)
*B08B 1/00* (2006.01)
*G05D 1/10* (2006.01)
*G05D 1/00* (2006.01)
*B08B 3/02* (2006.01)
*B64U 10/13* (2023.01)
*B64U 101/00* (2023.01)

(52) U.S. Cl.
CPC .............. *B64C 39/024* (2013.01); *B64D 1/18* (2013.01); *G05B 13/0265* (2013.01); *G05D 1/0088* (2013.01); *G05D 1/104* (2013.01); *G08G 5/0069* (2013.01); *B64U 10/13* (2023.01); *B64U 2101/00* (2023.01); *B64U 2201/10* (2023.01)

(58) Field of Classification Search
CPC ...... B64D 1/18; B64U 10/13; B64U 2101/00; B64U 2201/10
See application file for complete search history.

(56) References Cited

U.S. PATENT DOCUMENTS

| | | | |
|---|---|---|---|
| 2017/0210470 A1* | 7/2017 | Pardell | H02S 40/10 |
| 2017/0305547 A1* | 10/2017 | Tamkin, Sr. | G08G 5/0069 |
| 2018/0118337 A1* | 5/2018 | Viel | B64C 39/024 |
| 2020/0050215 A1 | 2/2020 | Kessler et al. | |

\* cited by examiner

SYSTEM AND METHOD FOR CLEANING SURFACES THROUGH DRONES

TECHNICAL FIELD

This disclosure relates generally to drones, and more particularly to system and method for cleaning surfaces through drones.

BACKGROUND

Metropolitan cities and developing towns across the world are characterized by a growing number of high-rise buildings and skyscrapers. Generally, the high-rise buildings include a glass exterior or showcase a glass façade. Eventually, the buildings need to be cleaned. Conventionally, cleaning of the glass exterior of a high-rise building is performed manually. Manual cleaning is time-consuming and hazardous for cleaners.

Drones or Unmanned Aerial Vehicles (UAVs) are increasingly used in automating difficult and time-consuming manual tasks. Drones may be deployed for cleaning purposes. However, use of drone formations in cleaning high-rise buildings is underexplored in the present state of art. Conventional techniques include use of automated cleaning machines for household purposes. However, the most techniques in the present state of art fall short in providing solutions for cleaning high-rise buildings using coordinated drone formations.

There is, therefore, a need in the present state of art for novel approaches to clean glass surfaces using drones or UAVs with path planning mechanisms and coordinated drone formations to perform the cleaning.

SUMMARY

In one embodiment, a method for cleaning surfaces through drones is disclosed. In one example, the method may include identifying, by a first drone, a cleaning strip in contact with a surface. The cleaning strip connects a second drone and a third drone. The second drone is communicatively coupled with the third drone. The first drone is communicatively coupled with each of the second drone and the third drone. The method may further include releasing, by the first drone, a cleaning agent at a preconfigured pressure upon a current target region of the surface near the cleaning strip. The method may further include relocating, by the second drone and the third drone, the cleaning strip upon the current target region. The method may further include performing, by the second drone and the third drone, a set of oscillations through the cleaning strip across the current target region. Each of the set of oscillations comprises coordinating a displacement of the cleaning strip by a predefined distance, alternating towards each of ends of the cleaning strip.

In one embodiment, a system for cleaning surfaces through drones is disclosed. In one example, the system may include a first drone including a container and a nozzle. The container is configured to store a cleaning agent. The first drone is configured to identify a cleaning strip in contact with a surface. The first drone is further configured to release, through the nozzle, the cleaning agent at a preconfigured pressure upon a current target region of the surface near the cleaning strip. The system may further include a second drone and a third drone connected through the cleaning strip. The second drone is communicatively coupled with the third drone. The first drone is communicatively coupled with each of the second drone and the third drone. Each of the second drone and the third drone includes a spool coil configured to wind the cleaning strip and unwind the cleaning strip. The second drone and the third drone are configured to relocate the cleaning strip upon the current target region. The second drone and the third drone are further configured to perform a set of oscillations through the cleaning strip across the current target region. For each of the set of oscillations, the second drone and the third drone coordinate a displacement of the cleaning strip by a predefined distance, alternating towards each of ends of the cleaning strip.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
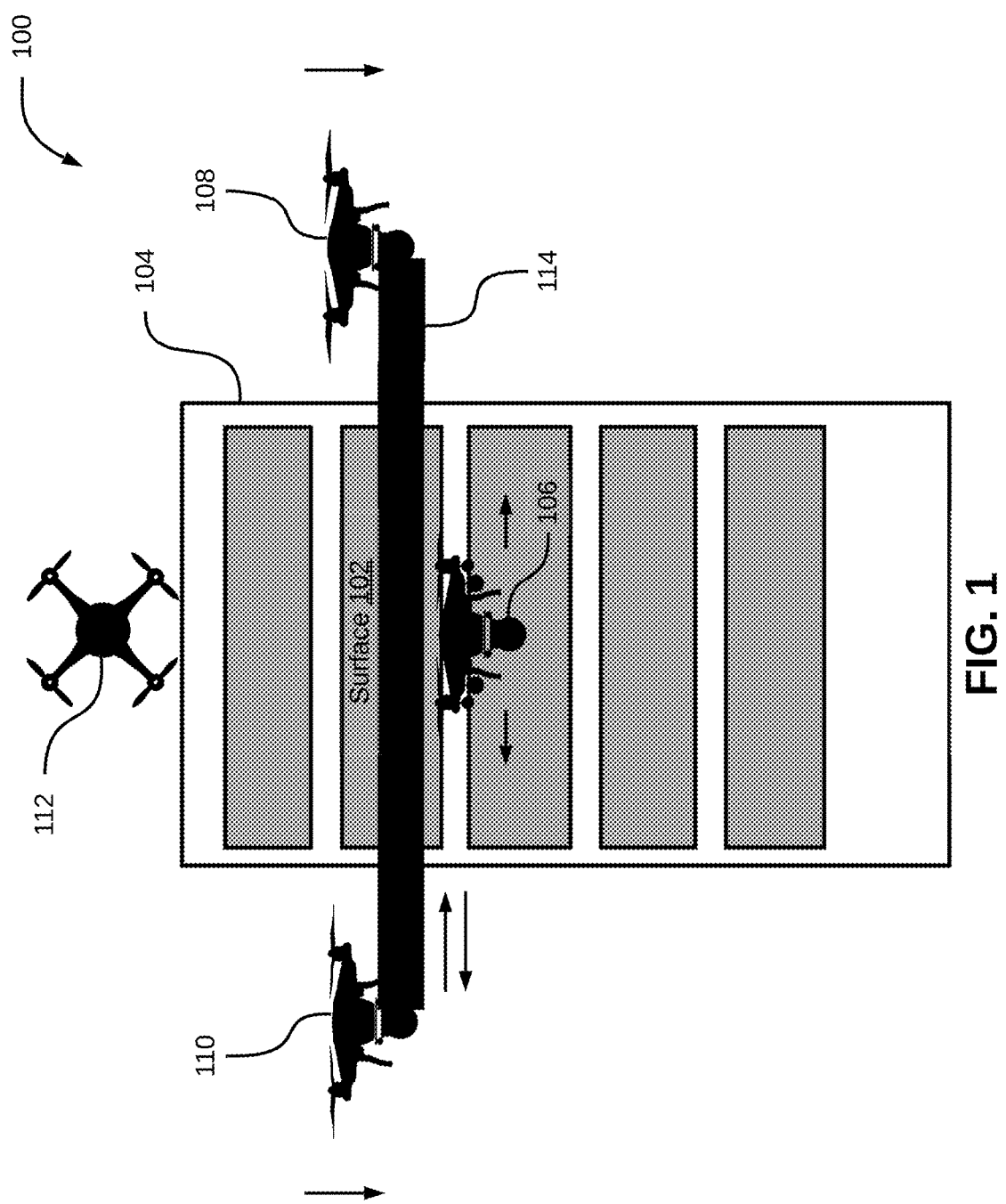
FIG. 1 illustrates an exemplary system for cleaning a surface of a building through drones, in accordance with some embodiments.

Referring now to FIG. 1, an exemplary system 100 for cleaning a surface 102 of a building 104 through drones is illustrated, in accordance with some embodiments. The system 100 includes a supplier drone 106, a cleaner drone 108, a cleaner drone 110, and a supervisor drone 112. It may be noted that each of the supplier drone 106, the cleaner drone 108, the cleaner drone 110, and the supervisor drone 112 may be an Unmanned Aerial Vehicle (UAV). The cleaner drone 108 and the cleaner drone 110 are connected through a cleaning strip 114. By way of an example, the cleaning strip 114 may include, but may not be limited to, microfiber cloth, a squeegee, a scrub brush, bristles, a sponge, silicone cleaning cloths, or a combination thereof. The cleaning strip 114 is attached to the cleaner drone 108 at one end and is attached to the cleaner drone 110 at other end. Further, the cleaning strip 114 is in contact with the surface 102.

In an embodiment, the supplier drone 106 includes a container and a nozzle (not shown in figure). The container is configured to store a cleaning agent (for example, a detergent solution, cleaning liquid, water, etc.). The supplier drone 106 identifies the cleaning strip 114 through a sensor (for example, Light Detection and Ranging (LIDAR) sensor, Radio Detection and Ranging (RADAR) sensor, etc.) or a camera. Further, the supplier drone 106 determines a current target region on the surface 102 near the cleaning strip 114. Further, the supplier drone 106 releases the cleaning agent through the nozzle at a pre-configured pressure upon the current target region. In an embodiment, the supplier drone 106 moves across the current target region of the surface 102 while releasing the cleaning agent to completely cover the current target region with the cleaning agent. In some exemplary scenarios, the current target region may be a horizontal region with a breadth equivalent to or less than a breadth of the cleaning strip 114. In some other exemplary scenarios, the current target region may be at an angle with respect to a horizontal plane of the surface 102 with a breadth equivalent to or less than the breadth of the cleaning strip 114.

Further, the cleaner drone 108 and the cleaner drone 110 relocate the cleaning strip 114 upon the current target region. Further, cleaner drone 108 and the cleaner drone 110 perform a set of oscillations through the cleaning strip 114 across the current target region. Each of the set of oscillations includes coordinating a displacement of the cleaning strip 114 by a predefined distance, alternating towards each of the ends of the cleaning strip 114. In an embodiment, each of the cleaner drone 108 and the cleaner drone 110 may include a spool coil configured to wind and unwind the cleaning strip 114. In another embodiment, each of the set of oscillations is performed through a coordinated winding and unwinding of the cleaning strip 114 by the spool coil of each of the cleaner drone 108 and the cleaner drone 110. For example, at an instance, the spool coil of the cleaner drone 108 may wind the cleaning strip 114 and the spool coil of the cleaner drone 110 may unwind the cleaning strip 114 simultaneously. Further, rate of winding of the spool coil of the cleaner drone 108 is equal to rate of unwinding of the spool coil of the cleaner drone 110.

Upon completing the set of oscillations by the cleaner drone 108 and the cleaner drone 110, the supplier drone 106 identifies a next target region on the surface 102. Further, the supplier drone 106 releases the cleaning agent upon the next target region. Further, the cleaner drone 108 and the cleaner drone 110 relocate the cleaning strip 114 upon the next target region. The current target region may be validated by one of the supplier drone 106 or the supervisor drone 112 for presence of one or more unclean regions. In some embodiments, one of the supplier drone 106 or the supervisor drone 112 determines whether the current target region includes one or more unclean regions. When the current target region includes one or more unclean regions, the cleaner drone 108 and the cleaner drone 110 relocate the cleaning strip 114 back upon the current target region and perform the set of oscillations through the cleaning strip 114. When the one or more unclean regions are absent in current target region, the cleaner drone 108 and the cleaner drone 110 perform the set of oscillations through the cleaning strip 114 across the next target region.

In some exemplary scenarios, the building 104 may include a gap between the current target region and the next target region. A gap may include an elevation above or a depth below a predefined threshold with respect to a plane of the surface 102. In such scenarios, one of the supplier drone 106 or the supervisor drone 112 identifies the gap between the current target region and the next target region. The cleaning agent is not released upon the gap. By way of an example, the gap may be a protrusion or a ridge between two floors of the building 104. In some embodiments, material composition of the gap may be different from material composition of the surface 102. Further, the cleaner drone 108 and the cleaner drone 110 lift the cleaning strip, when the gap is an elevation above the predefined threshold, by a height greater than the elevation of the gap above the surface.

In some embodiments, at least one of the supplier drone 106, the cleaner drone 108, the cleaner drone 110, and the supervisor drone 112 may be controlled from a central controlling unit (not shown in figure). In an embodiment, the central controlling unit may include a processor and a computer-readable medium (such as, a memory). By way of an example, the central controlling unit may be a server, desktop, laptop, notebook, netbook, tablet, smartphone, mobile phone, or any other computing device. The central controlling unit may be manually operated or automatically operated through an Artificial Intelligence (AI) model. It may be noted that each of the supplier drone 106, the cleaner drone 108, the cleaner drone 110, and the supervisor drone 112 may include a processor and a computer-readable medium (such as, a memory). Further, each of the supplier drone 106, the cleaner drone 108, the cleaner drone 110, and the supervisor drone 112 may include a plurality of sensors. The plurality of sensors may include, but may not be limited to, visual sensors, acoustic sensors, liquid level sensors, battery level sensors, pressure sensors, altitude sensors, and the like.

As will be appreciated by one skilled in the art, a variety of processes may be employed for cleaning surfaces through drones. For example, the system 100 may clean surfaces by the processes discussed herein. In particular, as will be appreciated by those of ordinary skill in the art, control logic and/or automated routines for performing the techniques and steps described herein may be implemented by the system 100 either by hardware, software, or combinations of hardware and software. For example, suitable code may be accessed and executed by the one or more processors on the exemplary system 100 to perform some or all of the techniques described herein. Similarly, application specific integrated circuits (ASICs) configured to perform some or all of the processes described herein may be included in the one or more processors on the system 100.

Figure 2:
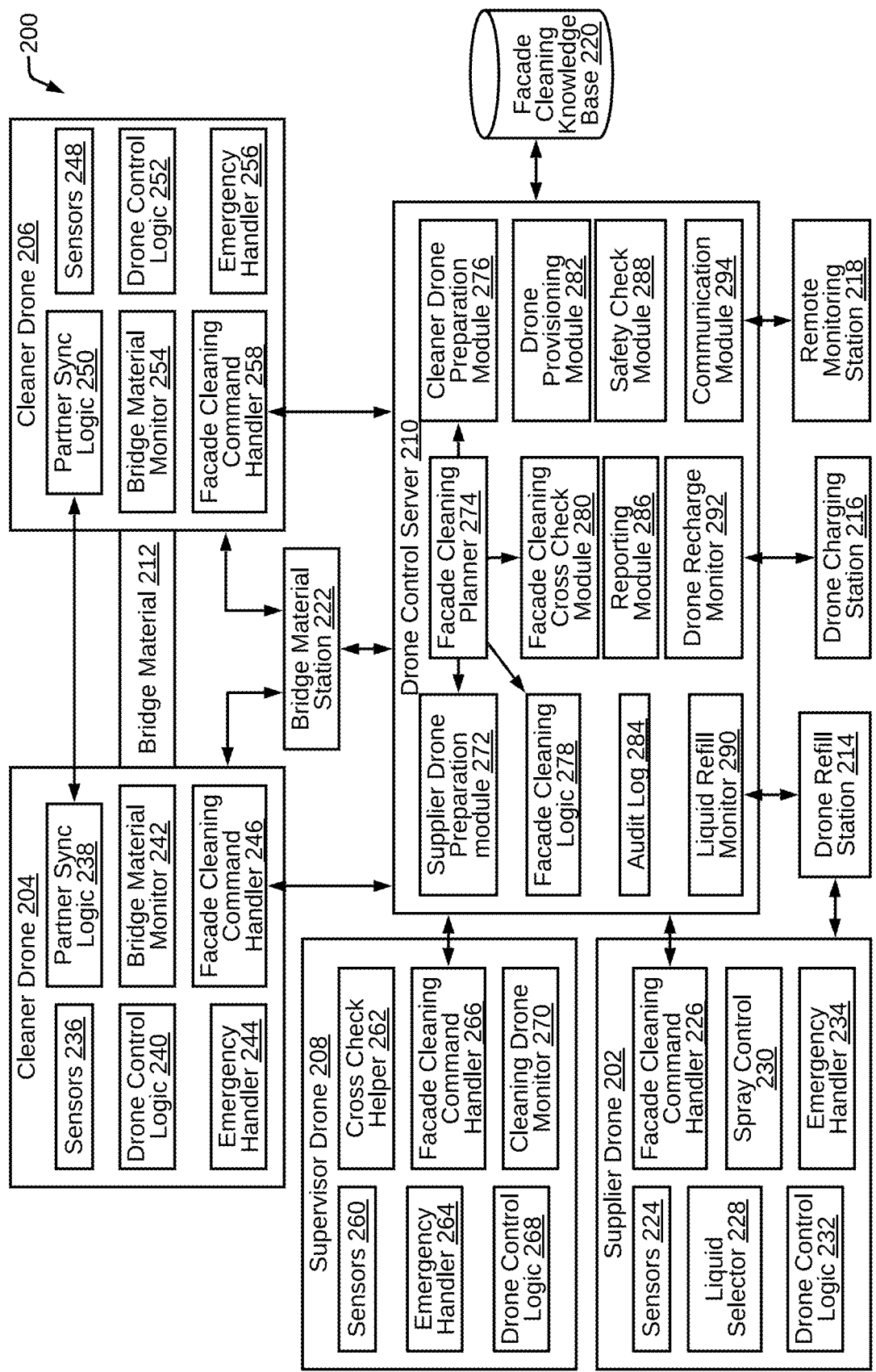
FIG. 2 is a functional block diagram of an exemplary system for cleaning surfaces through drones, in accordance with some embodiments.

Referring now to FIG. 2, a functional block diagram of an exemplary system 200 for cleaning surfaces through drones is illustrated, in accordance with some embodiments. The system 200 may be analogous to the system 100. The system 200 may include a supplier drone 202, a cleaner drone 204, a cleaner drone 206, a supervisor drone 208, and a drone control server 210. The cleaner drone 204 is connected to the cleaner drone 206 through a bridge material 212. The bridge material 212 is analogous to the cleaning strip 114. The system 200 may further include a drone refill station 214, a drone charging station 216, a remote monitoring station 218, a façade cleaning knowledge base 220, and a bridge material station 222.

The supplier drone 202 identifies a target region on a surface (for example, a façade) and releases a cleaning agent upon the target region. The supplier drone 202 includes sensors 224, a façade cleaning command handler 226, a liquid selector 228, a spray control 230, a drone control logic 232, and an emergency handler 234. Further, the supplier drone 202 may include a container for storing a cleaning agent (for example, detergent, water, cleaning liquid, etc.) and a nozzle for releasing the cleaning agent upon the target region or the bridge material 212. In an embodiment, the supplier drone 202 manages level of the cleaning agent wirelessly. In another embodiment, the supplier drone 202 may operate in a tethered mode, where supply of the cleaning agent is provided continuously.

The spray control 230 monitors releasing of the cleaning agent (for example, by spraying), at a pre-configured pressure through the nozzle. In some embodiments, a mechanical arrangement other than the nozzle may be present in the supplier drone 202. Further, the spray control 230 enables the supplier drone 202 to start or stop releasing the cleaning agent from the containers. Further, the spray control 230 monitors a release pressure of the cleaning agent. Additionally, the spray control 230 monitors the level of the cleaning agent in various containers. The liquid selector 228 may dynamically select a cleaning agent from a plurality of cleaning agents to clean a specific region on the surface of the building. In an embodiment, the liquid selector 228 may select the cleaning agent based on instructions received from the drone control server 210.

The sensors 224 may include visual sensors for navigation, a depth sensor for positioning from the surface in proximity of the supplier drone 202, and pressure and temperature sensors to ensure optimal working conditions. Further, the sensors 224 may include accelerometer, gyroscopes and other sensors generally required for navigation. The façade cleaning command handler 226 monitors messages related to real-time parameters of the supplier drone 202. The façade cleaning command handler 226 exchanges data with the drone control server 210. Further, the façade cleaning command handler 226 establishes and maintains communication in the supplier drone 202. Further, the façade cleaning command handler 226 receives case-specific commands from the drone control server 210 devised to control aspects or parameters of the supplier drone 202.

The drone control logic 232 receives a set of instructions from the drone control server 210 via the façade cleaning command handler 226. The set of instructions may include commands for determining navigation and path planning of the supplier drone 202. The drone control logic 232 is developed by the drone control server 210 based on dynamic inputs received. The emergency handler 234 provides disaster preparedness to the supplier drone 202. In situations including unforeseen circumstances which may be precarious to the supplier drone 202 or the building, the emergency handler 234 may enforce an action to ensure safety for the supplier drone 202 and the building.

The cleaner drone 204 may include sensors 236, a partner sync logic 238, a drone control logic 240, a bridge material monitor 242, an emergency handler 244, and a façade cleaning command handler 246. The sensors 236, the drone control logic 240, the emergency handler 244, and the façade cleaning command handler 246 of the cleaner drone 204 are functionally analogous to the sensors 224, the drone control logic 232, the emergency handler 234, and the façade cleaning command handler 226 of the supplier drone 202, respectively.

The cleaner drone 206 may include sensors 248, a partner sync logic 250, a drone control logic 252, a bridge material monitor 254, an emergency handler 256, and a façade cleaning command handler 258. The sensors 248, the drone control logic 252, the emergency handler 256, and the façade cleaning command handler 258 of the cleaner drone 206 are functionally analogous to the sensors 224, the drone control logic 232, the emergency handler 234, and the façade cleaning command handler 226 of the supplier drone 202, respectively.

The cleaner drone 204 coordinates with the cleaner drone 206 to clean the surface of the building. It may be noted that the cleaner drone 204 is connected to the cleaner drone 206 through the bridge material 212. The cleaner drone 204 and the cleaner drone 206 coordinate to dynamically maintain a preconfigured tension of the bridge material 214 while on flight. The bridge material 212 performs the cleaning on the surface. The bridge material 212 is held by the cleaner drone 204 and the cleaner drone 206 in contact with the surface at a pre-configured tension. The façade cleaning knowledge base 220 selects a material type for the bridge material 212 based on cleaning requirements. By way of an example, the material type may be, but may not be limited to, a microfiber cloth, a sponge, a scrubber, a squeegee, or a combination thereof. In an embodiment, each of the cleaner drone 204 and the cleaner drone 206 include a spool coil configured to wind the cleaning strip and unwind the cleaning strip. In such an embodiment, the bridge material 212 may be initially wound and stored in the spool coil. In another embodiment, the bridge material 212 may include Velcro at various stages to open stepwise, when the cleaner drone 204 and the cleaner drone 206 pull the bridge material 212 apart. It may be noted that the cleaner drone 204 and the cleaner drone 206 may include an auxiliary material to bind the bridge material 212 for providing an additional support or an elasticity feature.

The partner sync logic 238 and the partner sync logic 250 monitor synchronization between the cleaner drone 204 and the cleaner drone 206. For example, when the cleaner drone 204 is backward with respect to a corresponding movement axis, the cleaner drone 206 should be forward with respect to a corresponding movement-axis. The partner sync logic 238 and the partner sync logic 250 draw inference from real-time parameters (such as, relative location of individual drones). Further, the partner sync logic 238 and the partner sync logic 250 facilitate a direct communication between the cleaner drone 204 and the cleaner drone 206. The bridge material monitor 242 and the bridge material monitor 254 monitor a tensile strain experienced by the bridge material 212. A tension meter may be attached to the bridge material 212 to obtain the tensile strain in real-time due to a pulling force by each of the cleaner drone 204 and the cleaner drone 206. The tension meter may allow the bridge material monitor 242 and the bridge material monitor 254 to dynamically monitor the tensile strain during the cleaning.

The supervisor drone 208 includes sensors 260, a cross check helper 262, an emergency handler 264, a façade cleaning command handler 266, a drone control logic 268, and a cleaning drone monitor 270. The sensors 260, the drone control logic 268, the emergency handler 264, and the façade cleaning command handler 266 of the supervisor drone 208 are functionally analogous to the sensors 224, the drone control logic 232, the emergency handler 234, and the façade cleaning command handler 226 of the supplier drone 202, respectively. Upon completing the cleaning of the current target region, the cross check helper 262 validates the current target region to inspect for one or more unclean regions. In some embodiments, location of each of the one or more unclean regions is obtained and communicated. The cleaning drone monitor 270 manages initial one-time navigation of each of the cleaner drone 204 and the cleaner drone 206 to an associated initial position with respect to the building. Further, the cleaning drone monitor 270 supervises winding and unwinding of the bridge material 212 by the spool coil associated with each of the cleaner drone 204 and the cleaner drone 206. Further, the cleaning drone monitor 270 supervises each of the cleaner drone 204 and the cleaner drone 206 to an associated initial position in the corresponding movement axis off the edges of the buildings. In some embodiments, a single UAV may perform a dual role of the supplier drone 202 and the supervisor drone 208 at a cost of a time overhead.

The drone control server 210 includes a supplier drone preparation 272, a façade cleaning planner 274, a cleaning drone preparation 276, a façade cleaning logic 278, a façade cleaning cross check module 280, drone provisioning 282, an audit log 284, a reporting module 286, a safety check module 288, a liquid refill monitor 290, a drone recharge monitor 292, and a communication module 294.

The communication module 294 manages communication and coordination between each of the above-mentioned modules. The communication module 294 may facilitate the communication between drones (the supplier drone 202, the cleaner drone 204, the cleaner drone 206, and the supervisor drone 208). It should be noted that the communication module 294 receives data from the drones and sends corresponding instructions to each of the drones. As will be appreciated, one drone's parameters may affect the other drones, so real-time drone parameters are communicated via the drone control server 210 to determine a common action affecting two or more drones in the system 200.

The façade cleaning planner 274 requires basic information regarding the building such as, but not limited to, geographical coordinates, height, width, and other infrastructural information, from a blueprint or from administration of the building. In an embodiment, the basic information is obtained by navigating a drone (for example, the supervisor drone 208 or the supplier drone 202) and scanning the surface of the building using visual sensors. Based on the basic information, an output of a basic 3-dimensional map object corresponding to the surface may be obtained. Further, relative position information of various objects or structures located at a height from a base surface level may be mapped. Further, the façade cleaning planner 274 captures surface information and generalizes a type and position of unclean regions present on the surface of the building. In some embodiments, when a size of the surface is large, the façade cleaning planner 274 may deploy multiple drones for the cleaning.

The façade cleaning logic 278 determines a path plan for the cleaner drones (the cleaner drone 204 and the cleaner drone 206), supervisor drone 208, and the supplier drone 202. Further, the façade cleaning logic 278 manages navigation of the drones in real-time through the communication module 294. The façade cleaning logic 278 keeps a record of a position for resuming the cleaning after an interruption. The facade cleaning planner 274 may provide the surface information to the façade cleaning logic 278. The façade cleaning logic 278 may derive positions of gaps (for example, concrete or brick projections) on the surface to be excluded from the cleaning. The façade cleaning knowledge base 220 may send information to the drone control server 210 about a type of the cleaning agent required for each region of the surface. Further, the drone control server 210 may send the information to the supplier drone 202 to switch the cleaning agent during the cleaning.

Upon completing the path planning, the supplier drone preparation module 272 accesses surface parameters (such as, types of stains, areas to be cleaned, and the like) received from the supplier drone 202 or the supervisor drone 208. The supplier drone preparation module 272 may determine one or more containers to be filled, a cleaning agent for each of the one or more containers, and a volume associated with the cleaning agent, based on the information received from the façade cleaning knowledge base 220. In an embodiment, the one or more containers may be filled and refilled autonomously with a predefined filling time and a predefined cleaning agent quantity estimates received from the façade cleaning knowledge base 220. In another embodiment, the filling and refilling may be performed in a tethered mode.

Upon completing the path planning, the cleaner drone preparation module 276 accesses surface parameters (such as, types of stains, areas to be cleaned, and the like) received from the supplier drone 202 or the supervisor drone 208. The cleaner drone preparation module 276 may determine a material type, a breadth, and a length associated with the bridge material 212, based on the information received from the façade cleaning knowledge base 220. In an embodiment, when dimensions of bridge material 212 is high, more than two cleaner drones may be recommended, based on the data received from the façade cleaning knowledge base 220.

The façade cleaning cross check module 280 receives a visual input from the supervisor drone 208. The visual input may include a target region where cleaning has been previously completed. Using the visual input, the façade cleaning cross check module 280 checks for remaining stains on the surface. Further, the façade cleaning cross check module 280 saves location of the remaining stains in a memory as unclean regions. In some embodiments, the cleaner drones may perform cleaning on the unclean regions upon completing a first round of cleaning of the surface. In some other embodiments, the cleaner drones may perform cleaning on an unclean area in real-time.

The liquid refill monitor 290 monitors the drone refill station 214 (such as, number of drones currently at the station, wait time, time estimate for refilling, availability of a particular cleaning agent, exact zone within the drone refill station 214 to refill, and the like). The drone recharge monitor 292 monitors the drone charging station 216 (such as, availability of slots, time estimate for recharging, wait time for charging, and the like). It may be noted that the drone charging station 216 navigates a drone within a plurality of zones of the drone charging station 216.

The safety check module 288 supervises a coordinated movement of the cleaner drones. Further, the safety check module 288 maintains a set of actions to be taken in case an anomaly is seen in the cleaning. During the cleaning, real-time data (such as, relative position, battery status, altitude, etc.) for each of the drones is communicated. The drones exchange data and communicate with each other via the drone control server 210 for supervision. Further, the drones make decisions in case of an anomaly. For example, in situations of excess air pressure on right side of the building, the pressure sensor for the bridge material 212 on left side of the cleaner drones may record a higher force than a predefined threshold range. Further, an appropriate action may be taken to counter the anomaly. The reporting module 286 generates reports for the cleaning, including factors such as, the cleaning agent used, time taken for cleaning, cleaning efficiency, etc. The audit log 284 maintains a sequential documentation of events and timestamps associated with the events during cleaning.

The drone charging station 216 may include one of wireless fast charging or replacement of batteries of the drones with new batteries. A drone may traverse to the drone charging station 216 when a charging of a battery associated with the drone or a dependent drone is low. The drone charging station 216 schedules a charging point for the drone in advance.

The drone refill station 214 is a zone for the supplier drone 202 to fill and refill the container with the cleaning agent. When a volume of the cleaning agent in each of one or more containers of the supplier drone 202 is below a predefined threshold volume, the supplier drone 202 may navigate to the drone refill station 214. In an embodiment, the drone refill station 214 may operate in an autonomous mode. In such an embodiment, the supplier drone may adjust in a required position. Further, the cleaning agent may be pumped into the container without manual intervention. The bridge material station 222 is a zone to replace the bridge material 212 upon breakdown or damage. In some scenarios, the bridge material station 222 may modify the bridge material 212 based on requirements of the cleaning. The remote monitoring station 218 is a remote server for supervising each of the modules of the system 200. The remote monitoring station 218 receives real-time data of the modules through cloud.

The drone provisioning module 282 provides new drones (supervisor drone or supplier drone) to the system 200 during the cleaning based on information received from the façade cleaning knowledge base 220. Further, the addition of new drones is communicated to the drones involved in the cleaning and the path planning is dynamically modified to accommodate the new drones. It may be noted that the new drones may be provided in situations where the cleaning is required to be completed earlier than estimated time, the supplier drone 202 is facing some technical issues, etc.

The façade cleaning knowledge base 220 stores information required by the system 200 in the cleaning. The façade cleaning knowledge base 220 provides the drone control server 210 with actions or choices to be undertaken for a given input. For example, upon receiving the data from the façade cleaning planner 274, the façade cleaning knowledge base 220 may include information about the material type to be selected for the bridge material 212 based on the surface, information about the cleaning agent to be selected for a target region of the surface, information about a type of cleaning (such as, wet, semi-wet, or dry) to be adopted, and the like.

It should be noted that all such aforementioned modules 202-294 may be represented as a single module or a combination of different modules. Further, as will be appreciated by those skilled in the art, each of the modules 202-294 may reside, in whole or in parts, on one device or multiple devices in communication with each other. In some embodiments, each of the modules 202-294 may be implemented as a dedicated hardware circuit comprising a custom application-specific integrated circuit (ASIC) or gate arrays, off-the-shelf semiconductors such as logic chips, transistors, or other discrete components. Each of the modules 202-294 may also be implemented in an edge device such as a field programmable gate array (FPGA), programmable array logic, programmable logic device, and so forth. Alternatively, each of the modules 202-294 may be implemented in software for execution by various types of processors. An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for cleaning surfaces through drones. For example, the exemplary system 200 may clean surfaces through drones by the processes discussed herein. In particular, as will be appreciated by those of ordinary skill in the art, control logic and/or automated routines for performing the techniques and steps described herein may be implemented by the system 200 either by hardware, software, or combinations of hardware and software. For example, a suitable code may be accessed and executed by one or more processors on the system 200 to perform some or all of the techniques described herein. Similarly, application specific integrated circuits (ASICs) configured to perform some or all of the processes described herein may be included in the one or more processors on the system 200.

Figure 3:
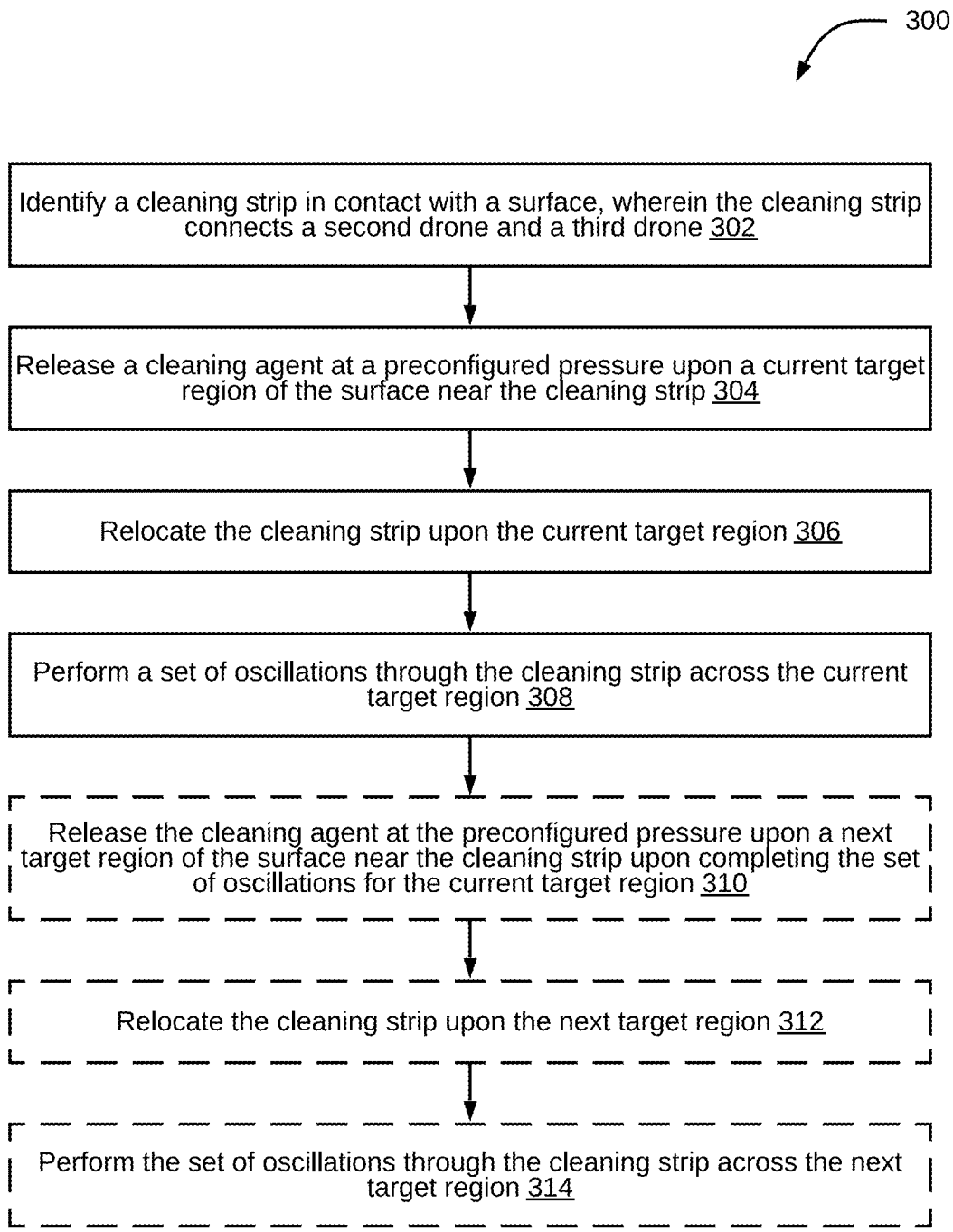
FIG. 3 illustrates a flow diagram of an exemplary process for cleaning surfaces through drones, in accordance with some embodiments.

Referring now to FIG. 3, an exemplary process 300 for cleaning surfaces through drones is depicted via a flow chart, in accordance with some embodiments. In an embodiment, the process 300 may be implemented by the system 100. The process 300 includes identifying, by a first drone, a cleaning strip (such as, the cleaning strip 114) in contact with a surface (such as, the surface 102), at step 302. In an embodiment, the first drone is the supplier drone 106. The cleaning strip connects a second drone and a third drone. In an embodiment, the second drone is the cleaner drone 108 and the third drone is the cleaner drone 110. The second drone is communicatively coupled with the third drone. The first drone is communicatively coupled with each of the second drone and the third drone.

The process 300 may further include releasing, by the first drone, a cleaning agent at a preconfigured pressure upon a current target region of the surface near the cleaning strip, at step 304. By way of an example, the supplier drone 106 may identify the cleaning strip 114 on the surface 102 of the building 104. The supplier drone 106 may determine a current target region on the surface 102 based on the location of the cleaning strip 114. In some embodiments, the current target region may be in proximity to the cleaning strip 114. In another embodiment, the current target region may be a region covered by the cleaning strip 114. Further, the supplier drone 106 may release the cleaning agent upon the current target region on the surface 102.

The process 300 may further include relocating, by the second drone and the third drone, the cleaning strip upon the current target region, at step 306. The process 300 may further include performing, by the second drone and the third drone, a set of oscillations through the cleaning strip across the current target region, at step 308. Each of the set of oscillations includes coordinating a displacement of the cleaning strip by a predefined distance, alternating towards each of ends of the cleaning strip. A tensile strain of the cleaning strip may be monitored in real-time. In an embodiment, the predefined distance is determined based on a predefined threshold shear stress of the cleaning strip. In another embodiment, the predefined distance is determined based on free space available for movement of the cleaner drone 108 and the cleaner drone 110. In some embodiments, the predefined distance is determined based on a combination of the predefined threshold shear stress and the free space available. In continuation of the example above, the cleaner drone 108 and the cleaner drone 110 may relocate the cleaning strip 114 upon the current target region on the surface 102. Further, the cleaner drone 108 and the cleaner drone 110 may perform the cleaning through the autonomous coordinated winding and unwinding of the cleaning strip 114 in each of the set of oscillations via the spool coil of each of the cleaner drone 108 and the cleaner drone 110.

The process 300 may further include releasing, by the first drone, the cleaning agent at the preconfigured pressure upon a next target region of the surface near the cleaning strip upon completing the set of oscillations for the current target region, at step 310. Alternately, the first drone may release the cleaning agent at the preconfigured pressure upon the next target region of the surface near the cleaning strip in parallel with the set of oscillations by the second drone and the third drone. The next target region is located approximately at a distance of a breadth of the cleaning strip from the current target region. The first drone may dynamically determine a level of the cleaning agent upon releasing the cleaning agent. Further, the first drone may initiate a refill of the cleaning agent when the level of the cleaning agent is below a predefined threshold level.

The process 300 may further include relocating, by the second drone and the third drone, the cleaning strip upon the next target region, at step 312. The process 300 may further include performing, by the second drone and the third drone, the set of oscillations through the cleaning strip across the next target region, at step 314. Additionally, at least one of the first drone and a fourth drone may validate the current target region upon relocating the cleaning strip. The validating may include determining whether the current target region includes one or more unclean regions. In an embodiment, the fourth drone is the supervisor drone 112.

In continuation of the example above, the supplier drone 106 may identify the next target region of the surface 102 upon completing the cleaning of the current target region. The supplier drone 106 may release the cleaning agent at the next target region. Further, the cleaner drone 108 and the cleaner drone 110 may relocate the cleaning strip 114 upon the next target region. The supervisor drone 112 may validate the current target region for presence of one or more unclean regions. When the one or more unclean regions are detected, the cleaning is repeated at the current target region. Based on the information received from the façade cleaning knowledge base 220 with respect to stains of the one or more unclean regions, the material type of the cleaning strip 114 and the cleaning agent to be used by the supplier drone 106 is determined for a second round of cleaning.

In an embodiment, at least one of the first drone, the second drone, the third drone, and the fourth drone may be controlled from a central controlling unit (for example, the drone control server 210). The central controlling unit is manually operated or automatically operated through an AI model. Further, at least one of the first drone and the fourth drone may identify a gap between the current target region and a next target region of the surface. The gap includes an elevation above or a depth below a predefined threshold. The cleaning agent is not released upon the gap. Further, when the gap includes an elevation above the predefined threshold, the second drone and the third drone lift the cleaning strip by a height greater than the elevation of the gap above the surface.

Figure 4:
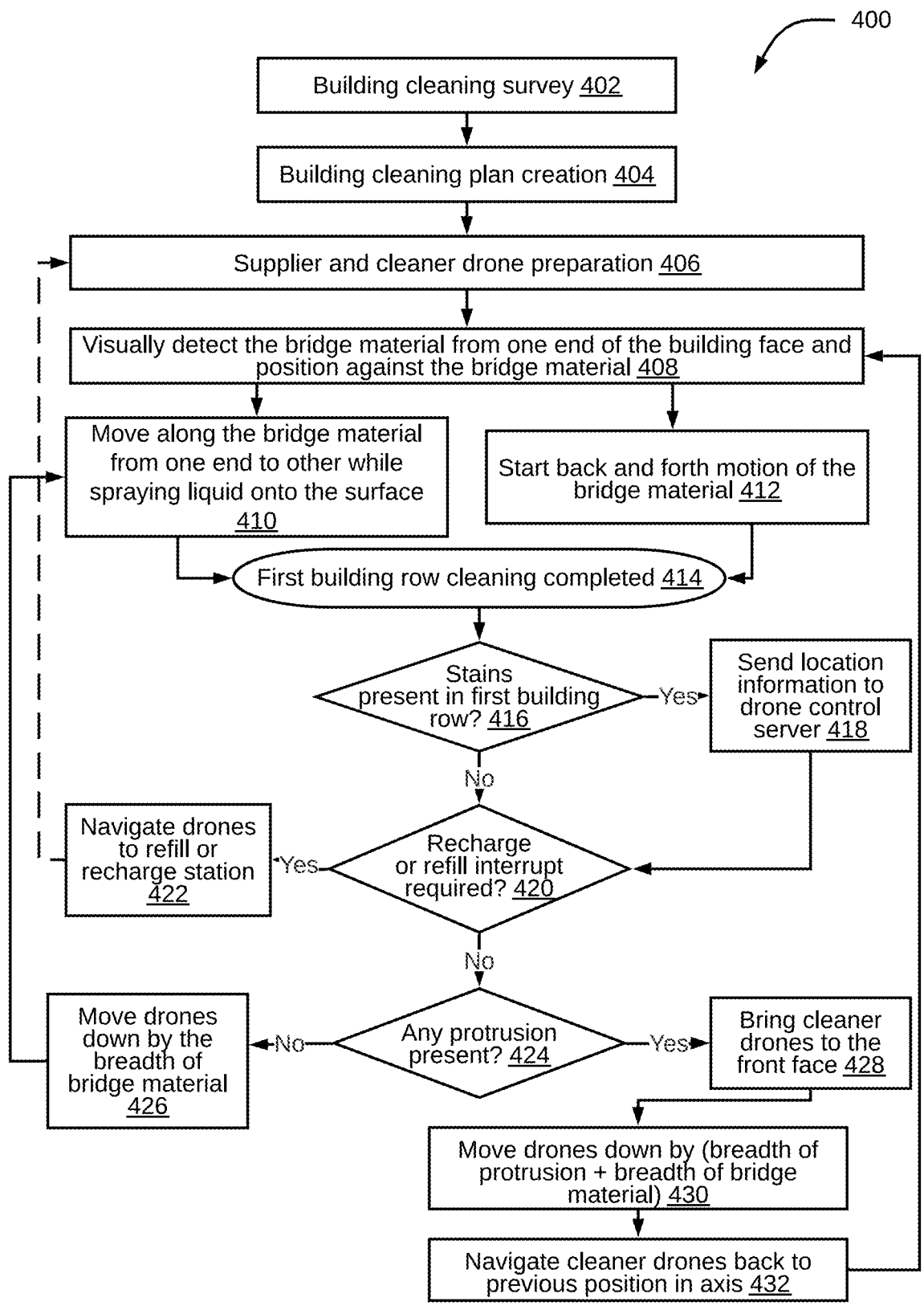
FIG. 4 illustrates a flow diagram of a detailed exemplary process for cleaning surfaces through drones, in accordance with some embodiments.

Referring now to FIG. 4, a detailed exemplary process 400 for cleaning surfaces through drones is depicted via a flowchart, in accordance with some embodiments. The process 400 may be implemented by the system 100. The process 400 includes surveying the building through the supervisor drone (for example, the supervisor drone 208), at step 402. The supervisor drone 208 collects requisite input data for the drone control server 210 for creating a path plan for cleaning a surface (such as, a façade) of the building. The process 400 further includes creating building path plan, at step 404. The drone control server 210 communicates the path plan to the drones with a case-specific set of instructions (such as, waypoints) upon processing the input data.

The process 400 further includes preparing the supplier drone (for example, the supplier drone 202) and the cleaner drones (for example the cleaner drone 204 and the cleaner drone 206), at step 406. The process 400 further includes detecting a bridge material (for example, the bridge material 212), through the supervisor drone, from one end of a face of the building and positioning against the bridge material, at step 408. The process 400 further includes moving along the bridge material from one end to other while spraying liquid onto the surface through the supplier drone, at step 410. The process 400 further includes starting back and forth motion of the bridge material through the cleaner drones, at step 412. The process 400 further includes completing the cleaning of the first building row, at step 414.

The supplier drone 202 is positioned at a first end of the current target region of the façade. Further, the supplier drone 202 detects an opaque strap of the bridge material 212 from the first end of the current target region and starts moving along the bridge material 212 towards a second end of the current target region while spraying a jet of cleaning agent. Simultaneously, the cleaner drones start a coordinated to-and-fro motion synchronously. Cleaning is achieved by repeated rubbing motion until the supplier drone 202 moves from the first end to the second end to ensure a high cleaning efficiency. Upon reaching the second end by the supplier drone 202, an entire row of the building is considered cleaned.

At step 416, a check is performed to determine whether stains are present in the first building row. When the stains are present in the first building row, the process 400 further includes sending location information of the stains to the drone control server, at step 418. When the stains are present in the first building row, a check is performed at step 420 to determine whether a recharge or a refill is required by at least one of the drones. When the recharge or the refill is required by at least one of the drones, the process 400 further includes navigating the at least one of the drones to a recharge station or a refill station, at step 422. Before initiating cleaning of the next target region, the supervisor drone 208 performs a validation of the current target region to check for one or more unclean regions. Presence of the one or more unclean regions is communicated to the drone control server 210. The one or more unclean regions of the current target region are cleaned in a second round of cleaning. In some scenarios, volume of the cleaning agent in the container of the supplier drone 202 may fall below a predefined threshold volume. In such scenarios, the supplier drone 202 navigates to the drone refill station 214 to obtain a new supply of the cleaning agent. Similarly, in scenarios of low battery in a drone, the drone navigates to the drone charging station 216. Refilling of the supplier drone 202 and charging of the drones may be performed in parallel or sequentially to optimize time taken for entire process.

When the recharge or the refill is not required by at least one of the drones, a check is performed at step 424 to determine whether a protrusion is present on the surface. When the protrusion is not present on the surface, the process 400 further includes moving the cleaner drones down by a height of the bridge material, at step 426. When the protrusion is present on the surface, the process 400 further includes bringing the cleaner drones to front face of the building, at step 428. The process 400 further includes moving the system down by a breadth of the bridge material and a breadth of the protrusion, at step 430. The process 400 further includes navigating the cleaner drones back to previous position in axis, at step 432. For the next target region, the drone control server 210 communicates the information whether a physical barrier (such as a brick, a concrete protrusion, or a steel protrusion) is present. When the physical barrier is absent, the drone control server 210 moves each of the drones downwards by a breadth of the bridge material 212 to start the cleaning of the next target region. When the physical barrier is present, drone control server 210 moves the cleaner drones to face of the building and moves the drones downwards by the breadth of the physical barrier+breadth of the bridge material. Further, the drone control server 210 sends the cleaner drones to original position with respect to the movement axis and resumes the cleaning. The cleaning terminates when the next target region reaches a ground level altitude or a predefined threshold height. Further, when the surface to be cleaned is large and the façade cleaning knowledge base 220 employs a wireless mode of the system 200, the cleaning is paused for a time interval. At pausing instance, each of the drones records current coordinates and navigates towards the drone charging station 216. From the façade cleaning knowledge base 220, estimated time required for charging may be obtained. Further, upon completing the time interval or upon successful recharge, the drones resume operation from the current coordinates.

Figure 5:
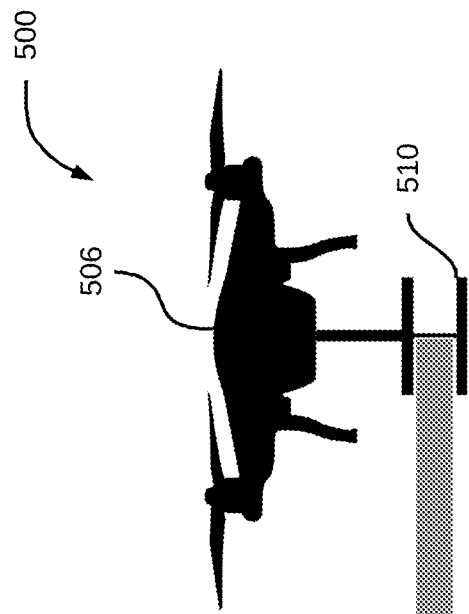
FIG. 5 illustrates an exemplary drone formation of cleaner drones connected with a cleaning strip, in accordance with some embodiments.
Figure 5:
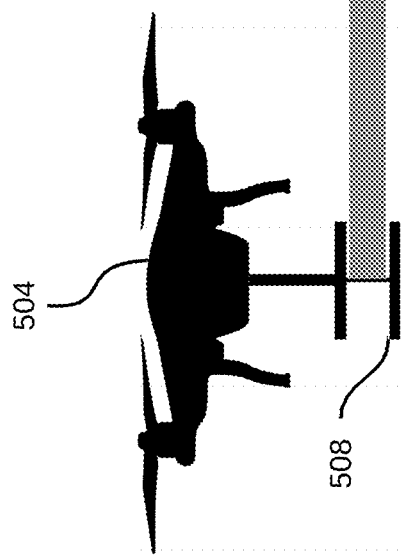

Referring now to FIG. 5, an exemplary drone formation 500 of cleaner drones connected with a cleaning strip 502, in accordance with some embodiments. The cleaning strip 502 is attached on one end to a cleaner drone 504 and is attached on other end to a cleaner drone 506. The cleaner drone 504 and the cleaner drone 506 are analogous to the cleaner drone 108 and the cleaner drone 110. The cleaner drone 504 includes a spool coil 508. Similarly, the cleaner drone 506 includes a spool coil 510. The spool coil 508 and the spool coil 510 are configured to wind and unwind the cleaning strip 502. During the cleaning, the cleaner drone 504 and the cleaner drone 506 coordinate a displacement of the cleaning strip 502 by a predefined distance, alternating towards each of ends of the cleaning strip. 502. During the displacement of the cleaning strip 502 towards the cleaner drone 504, the spool coil 508 winds the cleaning strip 502 and the spool coil 510 unwinds the cleaning strip 502 simultaneously. In an embodiment, rate of winding of the cleaning strip 502 is equal to rate of unwinding of the cleaning strip 502. A tensile strain of the cleaning strip 502 is monitored in real-time. In an embodiment, the predefined distance is determined based on a predefined threshold shear stress of the cleaning strip 502, free space available for movement of the cleaner drone 506 and the cleaner drone 508, or a combination thereof.

Figure 6:
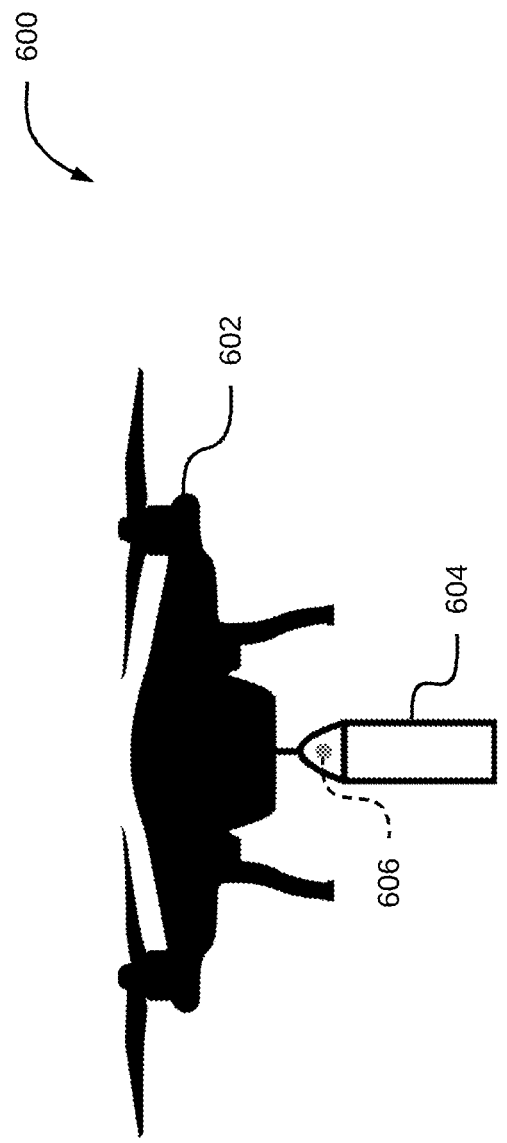
FIG. 6 illustrates an exemplary supplier drone, in accordance with some embodiments.

Referring now to FIG. 6, an exemplary supplier drone 600 is illustrated, in accordance with some embodiments. The supplier drone 600 may be analogous to the supplier drone 106. The supplier drone 600 includes a drone body 602, a container 604, and a nozzle 606. The container 604 is configured to store the cleaning agent. The supplier drone 600 releases the cleaning agent at a pre-configured pressure upon the surface via the nozzle 606. In some embodiments, the supplier drone 600 may include multiple containers and a nozzle for each of the multiple containers. in such embodiments, one or more cleaning agents may be separately stored in the multiple containers. Based on the information received from the façade cleaning knowledge base 220, a cleaning agent may be determined for the supplier drone 600 to release. The liquid selector 228 may select the cleaning agent determined by the façade cleaning knowledge base 220. Further, the cleaning agent may be released via the nozzle by the supplier drone 600.

Figure 7:
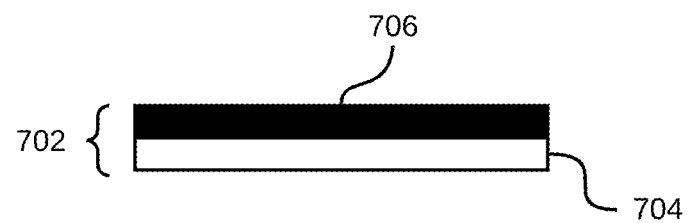
FIG. 7 illustrates an exemplary cleaning strip, in accordance with some embodiments.

Referring now to FIG. 7, an exemplary cleaning strip 702 is illustrated, in accordance with some embodiments. The cleaning strip 702 may include a first layer 704 and a second layer 706. The first layer 704 may include a cleaning material (for example, sponge, microfiber cloth, or the like). The second layer 706 may include a binding material (for example, elastic rubber, rubber blade, scrubber, or the like). The first layer 704 performs the cleaning. In some scenarios, the second layer 706 provides mechanical support to the first layer 704. In some scenarios, the second layer 706 may be used for cleaning unclean regions of the first round of cleaning. In such scenarios, the façade cleaning knowledge base 220 may determine a layer to be used for cleaning based on stain type. In some embodiments, the cleaning strip 702 may operate without the second layer 706.

Figure 8A:
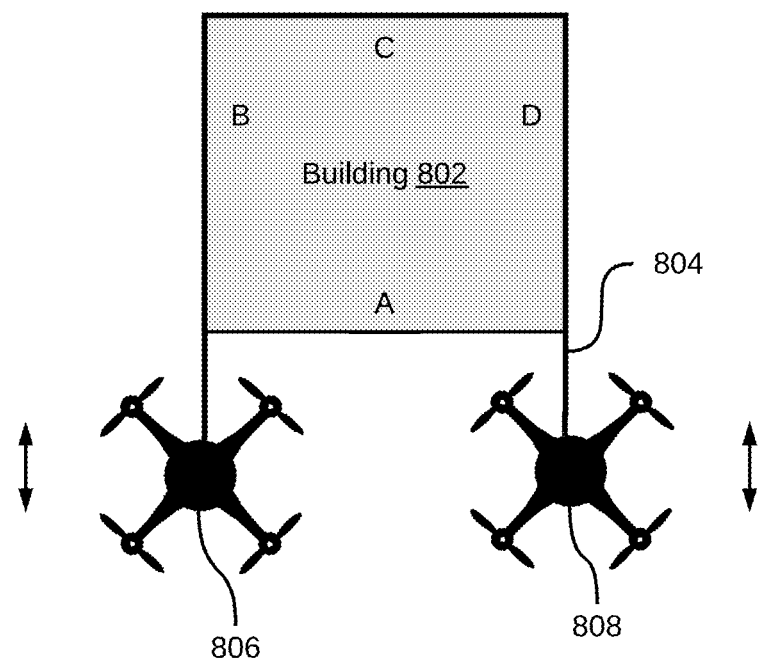
FIGS. 8A and 8B illustrate cleaning of a surface of a cuboidal building through cleaner drones, in accordance with some embodiments.
Figure 8B:
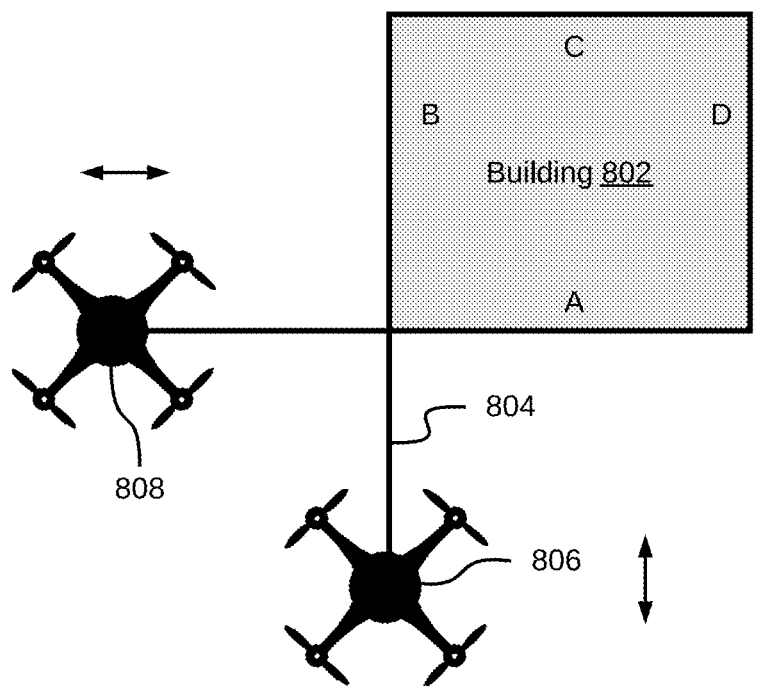

Referring now to FIGS. 8A and 8B, cleaning of a surface of a cuboidal building 802 through cleaner drones is illustrated, in accordance with some embodiments. In FIG. 8A, a cleaning strip 804 is attached to a cleaner drone 806 and a cleaner drone 808. The cleaner drone 806 and the cleaner drone 808 are analogous to the cleaner drone 108 and the cleaner drone 110. In an embodiment, the cleaner drone 806 and the cleaner drone 808 are located against a first face A of the building 802. The cleaning strip 804 is in contact with surface of each of a second face B, a third face C, and a fourth face D of the building 802. The second face C is opposite to the first face A of the building 802 and the third face B and the fourth face D are adjacent to the first face of the building 802. The cleaning is performed through coordinated winding and unwinding of the cleaning strip 804 by the spool coil of each of the cleaner drone 806 and the cleaner drone 808. Three faces of the building 802 are cleaned by the cleaner drone 806 and the cleaner drone 808 in a single round.

In FIG. 8B, the cleaner drone 806 is located against the first face A of the building 802 and the cleaner drone 808 is located against the third face B of the building 802. The cleaning strip 804 is in contact with surface of each of the first face A, the second face C, the third face B, and the fourth face D of the building 802. The cleaning is performed through coordinated winding and unwinding of the cleaning strip 804 by the spool coil of each of the cleaner drone 806 and the cleaner drone 808. Four faces of the building 802 are cleaned by the cleaner drone 806 and the cleaner drone 808 in a single round.

Figure 9:
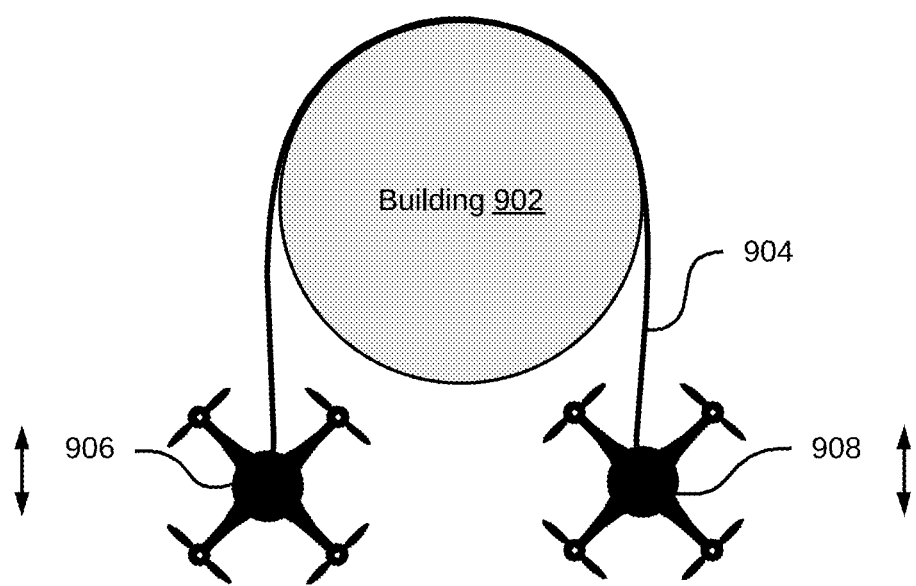
FIG. 9 illustrates cleaning of a surface of a cylindrical building through cleaner drones, in accordance with some embodiments.

Referring now to FIG. 9, cleaning of a surface of a cylindrical building 902 through cleaner drones is illustrated, in accordance with some embodiments. A cleaning strip 904 is attached to a cleaner drone 906 and a cleaner drone 908. The cleaner drone 906 and the cleaner drone 908 are analogous to the cleaner drone 108 and the cleaner drone 110 of the system 100. In an embodiment, the cleaner drone 906 and the cleaner drone 908 are located tangentially to the building 902. The cleaning strip 904 is in contact with a first half of circumference of surface of the building 902. The first half of the circumference of the surface is opposite to the cleaner drone 906 and the cleaner drone 908. The cleaning is performed through coordinated winding and unwinding of the cleaning strip 904 by the spool coil of each of the cleaner drone 906 and the cleaner drone 908. Half of the circumference of the surface of the building 902 is cleaned by the cleaner drone 906 and the cleaner drone 908 in a single round.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. The disclosed methods and systems may be implemented on a conventional or a general-purpose computer system, such as a personal computer (PC) or server computer.

Thus, the disclosed system and method try to overcome the technical problem of cleaning surfaces through drones. The system and method provide a solution for cleaning glass surfaces of skyscrapers. The drones follow a coordinated navigation and path planning to clean the surfaces. Further, repeated cleaning scenarios for entire surfaces are avoided and cleaning is repeated upon detection of unclean regions by a supervisor drone. The drones complete the cleaning of the surface followed by validation of the cleaning. Path planning of the drones is specific for each cleaning scenario. Further, human accidents are avoided by automating the cleaning by using the drones.

As will be appreciated by those skilled in the art, the techniques described in the various embodiments discussed above are not routine, or conventional, or well understood in the art. The techniques discussed above provide for cleaning surfaces through drones. The techniques first identify, by a first drone, a cleaning strip in contact with a surface. The cleaning strip connects a second drone and a third drone. The second drone is communicatively coupled with the third drone. The first drone is communicatively coupled with each of the second drone and the third drone. The techniques may then release, by the first drone, a cleaning agent at a preconfigured pressure upon a current target region of the surface near the cleaning strip. The techniques may then relocate, by the second drone and the third drone, the cleaning strip upon the current target region. The techniques may then perform, by the second drone and the third drone, a set of oscillations through the cleaning strip across the current target region. Each of the set of oscillations includes coordinating a displacement of the cleaning strip by a predefined distance, alternating towards each of ends of the cleaning strip.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described system and method for cleaning surfaces through drones. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for cleaning surfaces through drones, the method comprising:
identifying, by a first drone, a cleaning strip in contact with a surface, wherein the cleaning strip connects a second drone and a third drone, wherein the second drone is communicatively coupled with the third drone, and wherein the first drone is communicatively coupled with each of the second drone and the third drone;
releasing, by the first drone, a cleaning agent at a preconfigured pressure upon a current target region of the surface near the cleaning strip;
relocating, by the second drone and the third drone, the cleaning strip upon the current target region; and
performing, by the second drone and the third drone, a set of oscillations through the cleaning strip across the current target region, wherein each of the set of oscillations comprises coordinating a displacement of the cleaning strip by a predefined distance, alternating towards each of ends of the cleaning strip.

2. The method of claim 1, further comprising releasing, by the first drone, the cleaning agent at the preconfigured pressure upon a next target region of the surface near the cleaning strip upon completing the set of oscillations for the current target region, wherein the next target region is located approximately at a distance of a breadth of the cleaning strip from the current target region.

3. The method of claim 2, further comprising:
relocating, by the second drone and the third drone, the cleaning strip upon the next target region; and
performing, by the second drone and the third drone, the set of oscillations through the cleaning strip across the next target region.

4. The method of claim 1, further comprising validating, by at least one of the first drone and a fourth drone, the current target region upon relocating the cleaning strip, wherein the validating comprises determining whether the current target region comprises one or more unclean regions.

5. The method of claim 1, further comprising:
identifying, by at least one of the first drone and a fourth drone, a gap between the current target region and a next target region of the surface, wherein the gap comprises an elevation above or a depth below a predefined threshold, and wherein the cleaning agent is not released upon the gap; and
lifting, by the second drone and the third drone, the cleaning strip, when the gap comprises an elevation above the predefined threshold, by a height greater than the elevation of the gap above the surface.

6. The method of claim 1, further comprising controlling at least one of the first drone, the second drone, and the third drone from a central controlling unit, wherein the central controlling unit is manually operated or automatically operated through an Artificial Intelligence (AI) model.

7. The method of claim 1, further comprising monitoring a tensile strain of the cleaning strip in real-time, wherein the predefined distance is determined based on a predefined threshold shear stress of the cleaning strip and free space available.

8. The method of claim 1, further comprising:
dynamically determining, by the first drone, a level of the cleaning agent upon releasing the cleaning agent; and
initiating a refill of the cleaning agent when the level of the cleaning agent is below a predefined threshold level.

9. A system for cleaning surfaces through drones, the system comprising:
a first drone comprising a container and a nozzle, wherein the container is configured to store a cleaning agent, and wherein the first drone is configured to:
identify a cleaning strip in contact with a surface; and
release, through the nozzle, the cleaning agent at a preconfigured pressure upon a current target region of the surface near the cleaning strip; and
a second drone and a third drone connected through the cleaning strip, wherein the second drone is communicatively coupled with the third drone, wherein the first drone is communicatively coupled with each of the second drone and the third drone, wherein each of the second drone and the third drone comprises a spool coil configured to wind the cleaning strip and unwind the cleaning strip, and wherein the second drone and the third drone are configured to:
relocate the cleaning strip upon the current target region; and
perform a set of oscillations through the cleaning strip across the current target region, wherein for each of the set of oscillations, the second drone and the third drone coordinate a displacement of the cleaning strip by a predefined distance, alternating towards each of ends of the cleaning strip.

10. The system of claim 9, wherein the first drone is further configured to release the cleaning agent at the preconfigured pressure upon a next target region of the surface near the cleaning strip upon completing the set of oscillations for the current target region, wherein the next target region is located approximately at a distance of a breadth of the cleaning strip from the current target region.

11. The system of claim 10, wherein the second drone and the third drone are further configured to:
relocate the cleaning strip upon the next target region; and
perform the set of oscillations through the cleaning strip across the next target region.

12. The system of claim 9, wherein at least one of the first drone and a fourth drone is further configured to validate the current target region upon relocating the cleaning strip, wherein to validate, at least one of the first drone and the fourth drone determines whether the current target region comprises one or more unclean regions.

13. The system of claim 9, wherein:
at least one of the first drone and a fourth drone is further configured to identify a gap between the current target region and a next target region of the surface, wherein the gap comprises an elevation above or a depth below a predefined threshold, and wherein the cleaning agent is not released upon the gap; and
the second drone and the third drone are configured to lift the cleaning strip, when the gap comprises an elevation above the predefined threshold, by a height greater than the elevation of the gap above the surface.

14. The system of claim 9, further comprising a central controlling unit configured to control at least one of the first drone, the second drone, and the third drone from a central controlling unit, wherein the central controlling unit is manually operated or automatically operated through an Artificial Intelligence (AI) model.

15. The system of claim 9, wherein the cleaning strip is further configured to monitor a tensile strain of the cleaning strip in real-time, wherein the predefined distance is determined based on a predefined threshold shear stress of the cleaning strip and free space available.

16. The system of claim 9, wherein the first drone is further configured to:
dynamically determine a level of the cleaning agent upon releasing the cleaning agent; and
initiate a refill of the cleaning agent when the level of the cleaning agent is below a predefined threshold level.

* * * * *